United States Patent
Binot et al.

(10) Patent No.: US 7,311,841 B2
(45) Date of Patent: Dec. 25, 2007

(54) METHOD FOR TREATING WATER BY BALLASTED FLOCCULATION AND DECANTATION

(75) Inventors: Patrick Binot, Rentilly par Bussy St Georges (FR); Claus Poulsen Dahl, Hedehusene (DK); Joseph Edward Zuback, Camarillo, CA (US)

(73) Assignee: OTV SA S.A. (FR)

( * ) Notice: Subject to any disclaimer, the term of this patent is extended or adjusted under 35 U.S.C. 154(b) by 221 days.

(21) Appl. No.: 10/499,108

(22) PCT Filed: Dec. 19, 2002

(86) PCT No.: PCT/FR02/04471

§ 371 (c)(1),
(2), (4) Date: Dec. 20, 2004

(87) PCT Pub. No.: WO03/053862

PCT Pub. Date: Jul. 3, 2003

(65) Prior Publication Data
US 2005/0103719 A1    May 19, 2005

(30) Foreign Application Priority Data
Dec. 21, 2001  (FR) .................................. 01 16777

(51) Int. Cl.
*C02F 1/52*  (2006.01)

(52) U.S. Cl. ...................... 210/666; 210/694; 210/711; 210/713; 210/727; 210/787

(58) Field of Classification Search ................. 210/713
See application file for complete search history.

(56) References Cited

U.S. PATENT DOCUMENTS

| 4,274,968 A | * | 6/1981 | Grutsch et al. ............. 210/666 |
| 4,675,112 A | | 6/1987 | Verde ......................... 210/616 |
| 4,927,543 A | | 5/1990 | Bablon et al. .............. 210/711 |
| 5,730,864 A | | 3/1998 | Delsalle et al. .......... 210/195.1 |

(Continued)

FOREIGN PATENT DOCUMENTS

FR           2 627 704        9/1989

(Continued)

*Primary Examiner*—Peter A. Hruskoci
(74) *Attorney, Agent, or Firm*—Coats & Bennett, P.L.L.C.

(57) ABSTRACT

The invention concerns a water treatment method which consists in introducing coagulated water in a flocculation zone, to enable flocculation of microflocs in the presence and around a ballast; introducing the mixture in a decantation zone; separating the treated water in overflow and a mixture of sludge and the ballast in underflow; conveying at least part of said mixture to a sludge/ballast separating system and recycling into or upstream of the flocculation zone the ballast and part of the sludge introduced in said separation system. The invention is characterized in that it comprises steps which consists in conveying the mixture to the sludge/ballast separating system; in subjecting said mixture to a ballast concentration, extracting the ballast from the sludge extracted from the separation system; and more than 20% of the volume entering the sludge/ballast separating system is recycled into or upstream of the flocculation zone, after passing through at least part of the sludge/ballast separation system; and the ballast has an effective diameter greater than 60 micrometers, and the sludge extracted from the treatment system has a concentration higher than 5 g/L.

11 Claims, 6 Drawing Sheets

U.S. PATENT DOCUMENTS

| | | | |
|---|---|---|---|
| 5,770,091 A * | 6/1998 | Binot et al. | 210/711 |
| 6,010,631 A | 1/2000 | Delsalle et al. | 210/713 |
| 6,210,587 B1 | 4/2001 | Vion | 210/711 |
| 6,645,386 B1 * | 11/2003 | Moreau et al. | 210/711 |
| 6,824,692 B2 * | 11/2004 | Binot et al. | 210/709 |
| 6,919,031 B2 * | 7/2005 | Blumenschein et al. | 210/711 |
| 6,966,993 B2 * | 11/2005 | Binot | 210/711 |

FOREIGN PATENT DOCUMENTS

| | | |
|---|---|---|
| FR | 2 719 234 | 11/1995 |
| FR | 2 758 812 | 7/1998 |
| FR | 2 785 899 | 5/2000 |

* cited by examiner

METHOD FOR TREATING WATER BY BALLASTED FLOCCULATION AND DECANTATION

The invention relates to the field of dressing. More precisely, the invention relates to a method of separating solids and liquids via flocculation and decantation, notably in the field of dressing.

Dressing, particularly for purification, of surface waters for drinking and municipal or industrial wastewater to be rid of pollution, frequently uses a method consisting in coagulating the water to be purified with a reactive coagulant often constituted of a trivalent metal salt, in flocculating the coagulated water with a reactive flocculent usually constituted of an organic polymer, and in decanting the flocs created in a decanter, the sludge being extracted at the bottom of the decanter, and the purified water extracted via overflowing of the decanter.

The invention particularly relates to the technology known as flocculation-decantation with ballasted flocs, which implements a ballast constituted of a fine granular material and of high density such as micro-sand for example, injected into or upstream from the flocculation zone, so as to increase the formation rate of the flocs by acting as an initiator of flocculation and also to increase via density growth the rate of decantation of the flocs created during the flocculation stage, which allows to reduce the size of the installation.

The micro-sand, with an average diameter of approximately 20 to 300 micrometers, more often 80 to 200 micrometers, is the most widely used ballast for availability and cost reasons.

The ballast is usually, for economic reasons regarding reuse, separated from the sludge extracted from the decantation installation and recycled in the method.

The loss of ballast is generally shared out between the loss through the purified water and the loss through the sludge extracted from the installation.

A renewed injection of ballast intended to make good the loss of ballast is envisaged at any given point of the circuit where the ballast passes through.

It is important to control the loss of ballast carried along with the sludge, as much in terms of limiting the expenditure on new ballast as in not deteriorating the quality of the extracted sludge.

The means used to separate the ballast from the extracted sludge and to recycle this ballast within the method whilst minimising the loss of ballast are generally chosen from static (such as decantation) or dynamic (such as centrifuging and cycloning) gravity separation techniques, more often than not via hydrocycloning of the sludge/ballast mix.

The loss of ballast in the overflow of the hydrocyclone, the most widely used means to separate the ballast from the extracted sludge, is generally, and for fixed hydrocyclone geometry and operating conditions, approximately proportional to the concentration of the ballast in the mix entering the hydrocyclone.

Thus, if a given flow rate of sludge containing ballast is to be processed in a given hydrocyclone, the loss of ballast in the overflow of the hydrocyclone is approximately doubled if the concentration of the ballast in the sludge is doubled, whilst all other operational parameters remain constant.

The suspended matter of the sludge, which are very fine, are practically not separated by means such as the commonly used hydrocyclones, except when very small sized hydrocyclones are used comprising very high risks of clogging the overflows and practically not used: the flow of suspended matter of the sludge is shared between the underflow and overflow of the hydrocyclone in approximately the same ratio as the flows of the hydraulic underflow and overflow.

Thus, for a flow rate of 40 $m^3/h$ containing 3000 kg/h of ballast and 400 kg/h of SM (suspended matter) of sludge, entering into a hydrocyclone with a cutting power of 99.9% over the used ballast, and a flow rate distribution of 20% in overflow, and 80% in underflow, a loss of ballast of about 3 kg/h is to be envisaged in overflow, and the sludge is approximately distributed at about 80 kg SM/h in underflow and 320 kg SP/h in overflow.

If the same flow rate is passed through a hydrocyclone distributing the flow rate at about 40% in underflow and 60% in overflow (by using for example a different diameter ratio for the underflow and the overflow) the sludge is approximately distributed at about 160 kg SP/h in overflow: compared to the first configuration, the quality of the recycled sludge is much greater.

The second hydrocyclone configuration will therefore be chosen when an increase in the flow rate of the re-circulating of the sludge is desired, but usually requires a higher input pressure into the hydrocyclone (and hence greater energy consumption) to maintain the loss of ballast at an acceptable level.

The distribution curve of a hydrocyclone represents the probability of a particle passing through the underflow depending on its diameter. We notice that this curve is all the better (higher probability of passing through the underflow for a given diameter) when the solid concentration (principally ballast, but also sludge) and the viscosity in the feed diminishes.

The malfunctioning risks of a hydrocyclone rapidly increase after a given concentration of solid in the underflow (often about 40% of solid in volume).

Finally, major losses of ballast can happen when the underflow of the hydrocyclone is clogged, the ballast thus exiting in overflow.

The ballasted flocculation decantation technology is notably disclosed in the following patents:
patent FR 2627704 published on 1 Sep. 1989;
patent FR 2719234 published on 3 Nov. 1995.

BRIEF DESCRIPTION OF THE DRAWINGS

FIGS. 1a and 1b detail the diagram of this type of ballasted flocculation decantation of ballast technology.

Figure 1A:
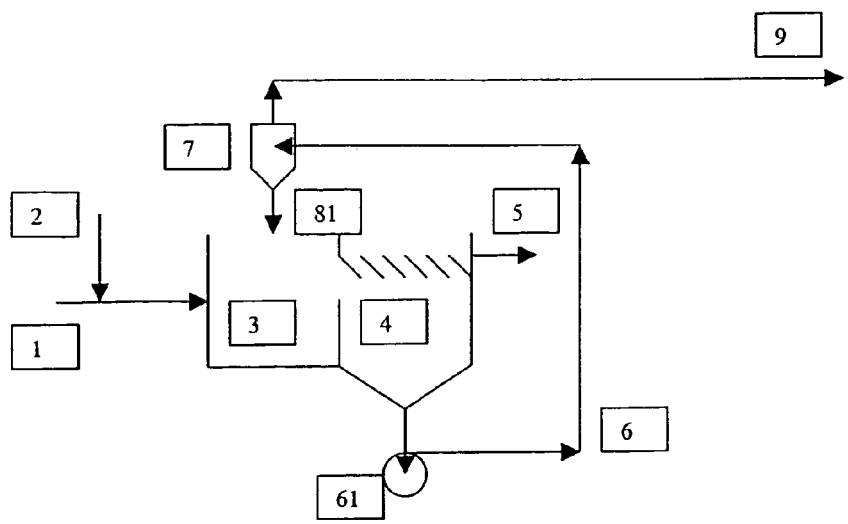
FIGS. 1a, 1b, and 2 show diagrams of ballasted flocculation decantation technology.

An intake of raw water 1 to be purified, with a coagulation zone (here represented by the portion of water duct positioned between the inlet of the reactive coagulant and the flocculation zone 3) via a reactive coagulant led by the means 2; the coagulated water is led into a flocculation zone 3 where it is flocculated, using a possible reactive flocculent, around particles of a ballast (generally micro-sand) insoluble in water and injected into or upstream from the flocculation. The flocculated water is then led into a decantation zone 4, equipped (FIG. 1a) or not (FIG. 1b) with decantation blades or any other decantation assistance device playing a similar role, in which the ballasted flocs of ballast rapidly decant and from where the water separated from the flocs is extracted in overflow of the decanter.

The ballasted sludge of ballast is pumped via raising means 61 (generally a pump, possibly via an air-lift playing an equivalent raising role) and sent to a means 7 allowing to extract the produced sludge 9 separated from ballast recycled by the underflow 81 in or upstream from the flocculation. This means 7 is usually comprised of a hydrocyclone which efficiently removes the ballast (sent to underflow) of the extracted sludge coming out in overflow. In a hydrocyclone, the incoming sludge is distributed between the underflow and the overflow in a ratio linked to the ratio between the underflow diameter and the overflow diameter.

The methods described in these two patents do not detail the choice of ballast/sludge separation carried out, which can, according to the specific purification needs of each particular implementation, favour an acceptable given loss of ballast:

either minimising the consumption of electricity, which, with a simple separation filter via hydrocycloning performed using the practice of recycling suspended matter (SP) of sludge in underflow of about 10% to 20% compared to the flow of SP entering into the hydrocyclone, and to the loss of ballast of about 1 to 3 g/m$^3$ of purified water;

or re-circulating the sludge, for example to increase via this means the concentration of sludge in the apparatus, and therefore their concentration in the extraction, or to increase the resting time of the sludge in the installation, which can be useful, notably when there is a desire to maximise the use of powdered activated carbon (PAC) injected to eliminate drops, odours or various organic matter upstream from the ballasted floc flocculation decantation installation.

In the case of using with a simple separation filter via hydrocycloning we can thus re-circulate up to at least 40% of the sludge in underflow, all the same with a greater energy consumption so as to compensate for the poorer performance of hydrocyclone separation in these operating conditions.

Figure 2:
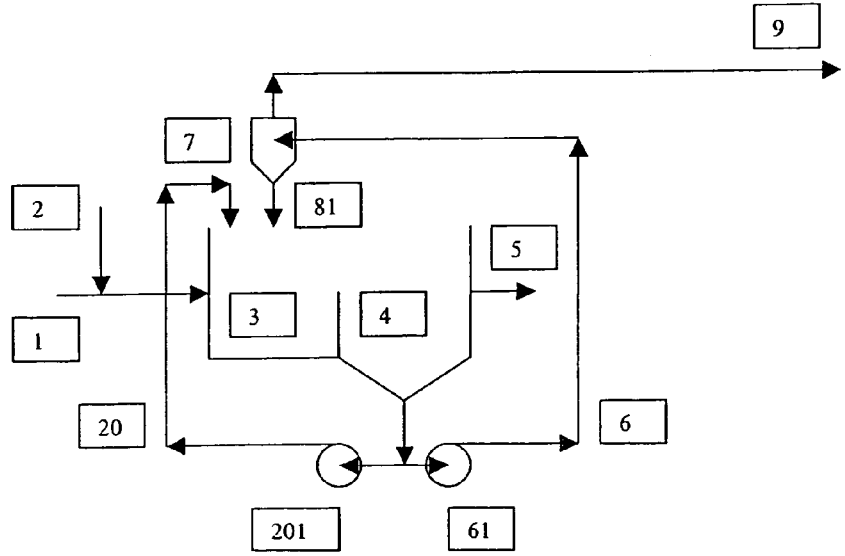

The use of a sludge/ballast separation system via a simple hydrocyclone filter imposes the choice between the energy consumption, ballast consumption and sludge concentration parameters, a choice which will be different depending on the main objective for each realisation published on The patent FR 275 8812 published on 31 Jul. 1998, diagrammitised in FIG. 2, has a modification to the devices envisaged in the above patents by adding a direct re-circulation loop 20 of a part of the decanted mix constituted of ballast and sludge towards the flocculation, without making this part of ballast and sludge decanted mix pass through the ballast/sludge separation organs envisaged in these patents.

This additional recycling loop, for a given production of suspended matter to be extracted and in consideration by way of illustration that 50% of the ballast/sludge volumetric flow rate pumped at the bottom of the decanter is recycled directly towards the flocculation, and only 50% of this same flow rate is subject to a separation to remove the ballast from the sludge prior to its extraction, allowing to approximately double the concentration of the extracted sludge.

This device therefore allows, when sought after, an increase in the concentration of the sludge extracted from the system according to the ratio between the part of the directly re-circulated ballast/sludge flow rate and the part of the ballast/sludge/water flow rate subject to a separation of the ballast from the sludge finally extracted from the system.

This patent claims a reduction in the electricity consumption linked to the direct recycling of a part of the mix constituted of sludge and ballast, which requires less energy than that needed for the ballast/sludge separation performed on all the sludge plus ballast flow rate taken from the bottom of the decanter.

The method disclosed in this patent however has various inconveniences:

It imposes additional investments, linked to the obligation to envisage two different re-circulation systems (pumps plus pipes and taps) but with a high concentration of ballast in the two systems (a system of direct ballast/sludge re-circulation towards the flocculation under low pressure, and a system of ballast/sludge re-circulation, ballast/sludge separation and extraction of sludge produced by the purification).

The concentration of ballast in the ballast/sludge mix sent into that of the re-circulation loops which comprise a separation remain the same as that which would be obtained without operating the direct re-circulation loop, that meaning major. Given the higher concentration in sludge and the equivalent concentration in ballast, and despite the lower flow rate of sludge/ballast to be separated in the case of implementing a direct re-circulation loop, the loss of ballast will only be improved with difficulty compared to purification systems without direct re-circulation.

Given the barely efficient system of ballast/sludge separation via decantation recommended in this patent, the minimal size of ballast required to limit the losses of ballast to an acceptable level, even if this level remains relatively high, is 200 micrometers, which poses purification quality problems at the time of starting up the installation, for example at the beginning of rain during the purification of overflows of unitary networks whilst raining (there is not as yet any sludge accumulated in the installation and the patent insists on the fact that the ballast is too big in size to be active on its own, without sludge, except if large quantities of ballast are implemented thus penalising the method). This large diameter of ballast also costs more in stirring energy in the flocculation tanks to maintain the ballast in suspension and to avoid the sludge at the bottom of the tanks.

One of the objectives of this invention is to propose dispositions allowing, simultaneously in the ideal case:

to extract from the purification system high-concentration sludge (high concentration here meaning concentrations greater than 5 g/L, preferably 10 g/L, and in any case greater than those resulting from a sludge/ballast re-circulation purification via simple hydrocycloning without attempting to re-circulate the sludge via the hydrocyclone underflow or from a similarly installed ballast/sludge separation system);

to minimise the loss of ballast led in the sludge leaving the system compared to the systems described in the aforementioned patents;

to minimise the corresponding investment costs, and notably avoid the expenditure linked to an additional direct re-circulation loop of the sludge plus ballast mix, such as is disclosed in patent FR 275 8812, expenditure which adds to the cost of the ballast/sludge recuperation systems disclosed in this patent;

to maintain the energy consumption of ballast/sludge re-circulation and separation at the reasonable levels obtained by the techniques disclosed in the above patents, without the need of using ballast of a diameter greater than 200 micrometers as required in the method disclosed in the patent FR 275 8812, which increases energy consumption for maintaining ballast in suspension in the flocculation zone and poses purification quality problems before the installing of sufficient sludge.

Another objective of this invention is to allow, by using disposition envisaged for the above objectives, or via other dispositions, a usage improvement of Powdered Activated Carbon (PAC), or other active granular products, which will be injected into the system with the aim of eliminating one or several given pollution parameters, such as, to eliminate drops, odours or even pollutants such as pesticides or other undesirable organic matter adsorbable on activated carbon.

These objectives are reached, totally or partially, by the following means, implemented separately or by any combination of them.

The implementation of purification systems disclosed in patents FR 262 7704 and FR 271 9234 when they classically use a hydrocyclone to separate the ballast from the sludge to be extracted from the system, and when a concentration of sludge is not sought after in the system, generally translates by re-circulation rates of about 3 to 12% of the input flow rate, by a re-circulation of about 99.9% of the ballast in the hydrocyclone underflow, and by a distribution of the sludge flow rate between the hydrocyclone overflow and underflow usually comprised between 90% overflow/10% underflow and 80% overflow/20% underflow depending on the type of hydrocyclone and overflow and underflow nozzle used.

Based on a situation starting from any one of the known ballasted flocculation-decantation technologies, which we hereafter use as a reference under the system name (S), such as disclosed in patents FR 262 7704 and FR 271 9234, or any other similar technology known to those skilled in the art, we hereafter describe various means of completing this system (S) and allowing to reach the desired objectives, with a common point consisting in re-circulating in the upstream direction of the decantation a part of the sludge issuing from the overflow or underflow of the sludge/ballast separator (comprised of a hydrocyclone, decanter, centrifuge, or any other equivalent means of separation), without an additional direct re-circulation loop as in patent FR 275 8812, and without the need to use ballast with a diameter greater than 200 micrometers in order to obtain a good recuperation of the ballast prior to the extraction of the sludge in the system. The ballast used would typically have an effective diameter between 40 and 300 micrometers, preferably between 80 and 200 micrometers.

In all the following examples, the possibly injected PAC will approximately follow, in terms of the increase of its resting time, the outcome of the sludge, the PAC seeing its resting time in the system, for a given dose of newly injected PAC, proportionally increase to its concentration (whose increase will in fact be, according to the experience of the applicant, slightly greater than the increase in concentration obtained for the sludge).

The starting situation (S) will be that of FIG. 1a, with a flow rate of raw water to be purified of 1000 m$^3$/h having a concentration of suspended matter of 300 mg/L, and a rate of sand allowing to re-circulate 3 kg of sand per m$^3$ of incoming raw water. 50 m$^3$/h of sludge/ballast mix is extracted from the bottom of the decanter and pumped towards a hydrocyclone extracting 40 m$^3$/h (that being 80% of the flow rate entering the hydrocyclone) of sludge at 8.4 g/L in the overflow of the hydrocyclone, and recycling starting from the underflow of the hydrocyclone towards the flocculation 10 m$^3$/h of a mix of sand with a concentration of 300 kg/m$^3$ and sludge of 8.4 g/L.

Admitting that we seek a concentration of sludge of about 17 g/L in the extracted sludge, we can increase the concentration of the extracted sludge up to 16.8 g/L by only extracting from the bottom of the decanter 25 m$^3$/h of sludge/ballast mix, but this will bring the concentration of sand in the underflow of the hydrocyclone to 600 kg/m$^3$, a concentration which is, for the hydrocyclone which was used during the test, a limit not to be exceeded as it would effect the quality of separation.

A first means (A) proposed by the invention in order to reach the desired objective by increasing the concentration of the extracted sludge to about 17 g/L whilst at least remaining far from the 600 kg/m$^3$ of ballast concentration in the underflow of the hydrocyclone will consist in choosing a means of ballast/sludge separation (hydrocyclone or decantation tank or any other similar means) maximising the quality of the re-circulated sludge in the underflow, whilst maintaining a quality of ballast/sludge separation limiting the loss of ballast in the sludge in the overflow.

This means was used by the applicant by using hydrocyclones set to obtain overflow/underflow ratios of sludge reaching 60% overflow/40% underflow, allowing, for the above indicated example, to bring the concentration of the extracted sludge from 8.4 g/L (in the case of a 80/20 overflow/underflow ratio, with 50 m$^3$/h extracted from the bottom of the decanter and a concentration of ballast in the underflow towards the hydrocyclone of 300 kg/m$^3$) to 17 g/L (for the overflow/underflow ratio 60/40, with 33.3 m$^3$/h extracted from the bottom of the decanter, and a concentration of ballast in the underflow of the hydrocyclone of 227 kg/m$^3$).

This means has the advantage of increasing the concentration of the extracted sludge from the system without requiring the additional investment of a direct recycling loop, and by working with a concentration of ballast in the underflow diminished compared to the diagram at the start, improving the distribution of the hydrocyclone and correlatively diminishing the loss of ballast.

This means requires the use of a flow rate from the re-circulation pump of about 66% of that of the diagram (S) at the start whilst increasing the concentration of the extracted sludge by a factor of more than 2 in the example given as a reference.

FIG. 1 can support the description of the means A: it simply suffices, to illustrate the implementation of this means with a hydrocyclone as means of separation, to increase the ratio of the diameter of the underflow to the diameter of the overflow of the hydrocyclone up to the desired level of recycling of the sludge by the underflow, and to adapt the characteristics of the pump to the load needed to maintain a ballast recuperation efficiency in compliance with the specifications.

A second means (B) proposed by the invention consists in recycling a part of the overflow of the means of separation (hydrocyclone or decantation tank or any other similar means) in the upstream direction of the flocculation.

This means, in the case of a 50% recycling of the overflow in the upstream direction of the flocculation, allow to increase the concentration of the extracted sludge from 8.4 g/L in the diagram at the start up to 16.9 g/L by maintaining the concentration of ballast in the underflow of the means of separation to 300 kg/m$^3$.

This means also has the advantage of increasing the concentration of the sludge extracted from the system without requiring the additional investment of a direct recycling loop (pump . . . ), with however the imposed limit by the limitation to the reasonable value of the concentration of ballast in the underflow of the means of separation (600 kg/m$^3$ in the case of the type of hydrocyclone used for the test described here).

Figure 1B:
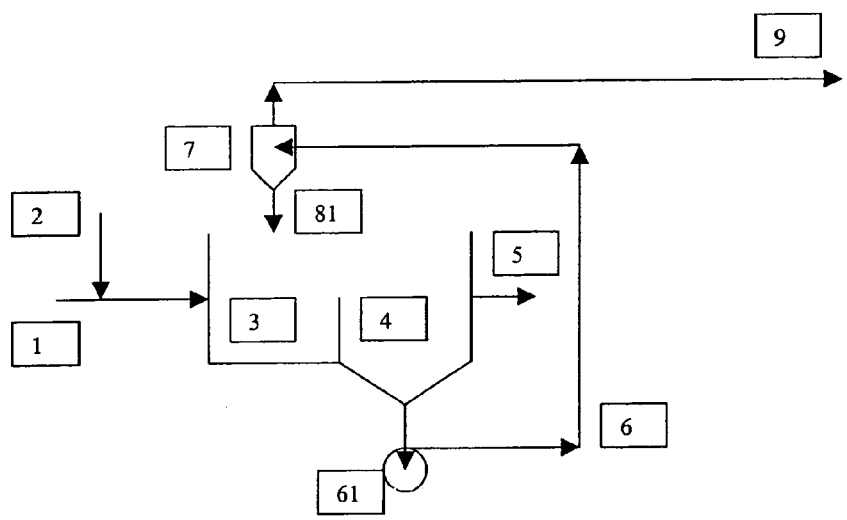
Figure 3:
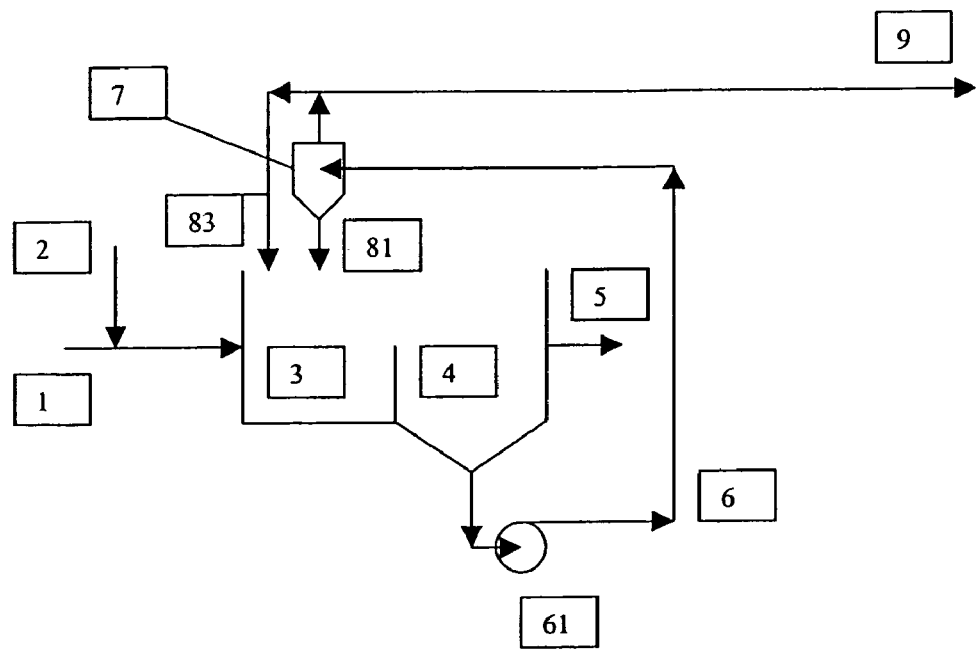
FIGS. 3-10 show diagrams of embodiments in the instant invention.

This means is described in FIG. 3, in which a recycling 83 of the sludge in the overflow of the means 7 is added compared to FIGS. 1a and 1b.

Of course, it is only a diagrammatic representation: all required means known to those skilled in the art to distribute the overflow between the extraction of the sludge 9 and the recycling of the sludge 83 can be envisaged. This distribution can notably be performed by using several hydrocyclones in parallel, in which some would have their overflow extracted from the system, and the rest would have their overflow entirely recycled.

The recycled sludge by means of 83 is added to that which is recycled in the underflow 81 with the ballast separated from the sludge.

A third means (C) proposed by the invention consists in combining the preceding means (A) and (B) to considerably increase the concentration of the extracted sludge without exceeding the limited concentrations of ballast acceptable in the underflow of the means of separation, so as to maintain the loss of ballast at a chosen limited level.

FIG. 3 also helps in understanding the means (C), implemented by an increase in the ratio of the diameter of underflow to the diameter of overflow of the means 7, in order to make a greater quantity of SM of sludge in the underflow 81 to pass through.

A fourth means (D) proposed by the invention consists in separating into at least two filters the means 7 of sludge/ballast separation envisaged to recuperate the ballast and to recycle it prior to the extraction of the sludge from the system.

To accomplish this, the invention envisages (see FIG. 4):

Firstly, to make the sludge/ballast mix extracted from the decanter circulate in a first means of ballast/sludge separation 71 of static gravity decanter, hydrocyclone or centrifugal type, preferably rustic, of low-pressure hydrocyclone or static gravity decanter type, using low separation energy to separate more than 10% of the sludge in the underflow 81, preferably from 30% to 70% of the sludge in the underflow, and even more preferable about 50% of the sludge in the underflow of this first means of separation, whereas the ballast will be roughly separated in order to pass into the underflow 81 in a weight ratio of ballast in the underflow to the ballast in the overflow greater than the volumetric ratio of the sludge in the underflow to the sludge in the overflow, preferably, in a underflow/overflow ratio greater than 60%, or even more preferable greater than 90%.

This first means of separation can be equipped with devices, not represented in the diagrams, improving the breaking of the ballast-floc of sludge connection, to facilitate the preferable passing of the ballast in the underflow of this means. These devices can be limited to the breaking of the flocs led via the passing into the pump and the re-circulation circuit, or be completed by grills or sieve plates placed in the re-circulation circuit upstream from the first means of separation, or in this first means of separation.

Secondly, the overflow 711 of the first means of separation, preferably rustic, is sent into a more efficient second means of sludge/ballast separation 72 of hydrocyclone or centrifugal type to efficiently remove the remaining ballast in the overflow 721 of the sludge to be extracted from the system.

This separation will be particularly efficient as the first separator 71 would have allowed to considerably diminish the concentration of the ballast in the mix entering via 711 into the second separator 72, and we know that the hydrocyclones notably have a diminishing separation efficiency with the concentration of solid matter in the underflow.

Furthermore, the wear on the second means of separation 72, particularly of its underflow 82, will be greatly diminished thanks to the relatively low concentration of ballast passing through under high energy.

We can at last play with the definition and operating parameters of the second means of separation 72 in order to optimise the system according to the operating priorities:

if it is desired to maximise the recuperation of the ballast in order to minimise the output with the extracted sludge, we will use a high energy system of separation, for example by inserting a pump 712 (see FIG. 7) between the means of separation 71 and 72, or even by increasing the power of the pump 61 to allow it to ensure a sufficient pressure at the inlet to the means of separation 72 so as to guarantee the desired limitation of the loss of sand.

if it is desired to minimise the consumption of energy, we will take advantage of the low concentration of ballast entering into the second system of separation 72 so as to separate the ballast with an equivalent efficiency to that consumed in the reference system (S), but with a lower energy consumption. In this case, there is generally no additional pump between 71 and 72, and we adapt the characteristics of the pump 61 to its work load;

if it is desired to further increase the concentration of extracted sludge we will have the possibility of increasing the flow rate of sludge in the underflow from either of the two means of separation, or even the possibility of recycling a part of the overflow of the second means, or of that of the first means, or even still a part of each of these two overflows.

We note that this combination of the two successive means of separation singularly limits the risks of loss of ballast.

Indeed the first means of circulation 71, would have an underflow 81 in which would pass through a major part of the flow rate of sludge, therefore a large diameter intrinsically limiting the risks of clogging in the case of large objects passing through the circuit.

Figure 5:
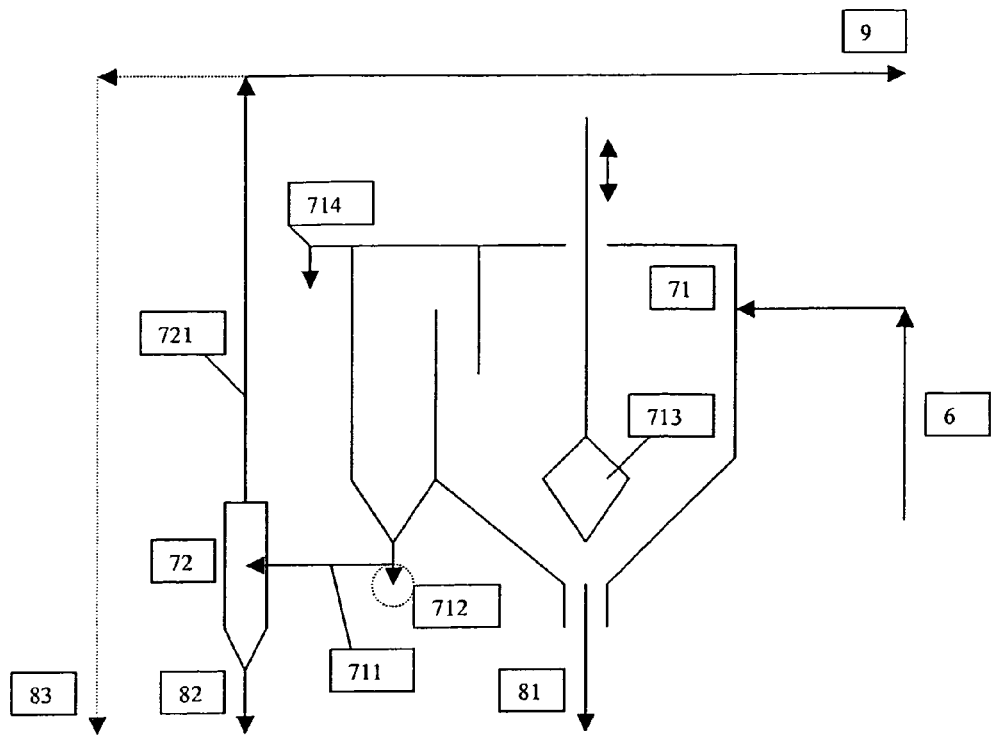
Figure 6:
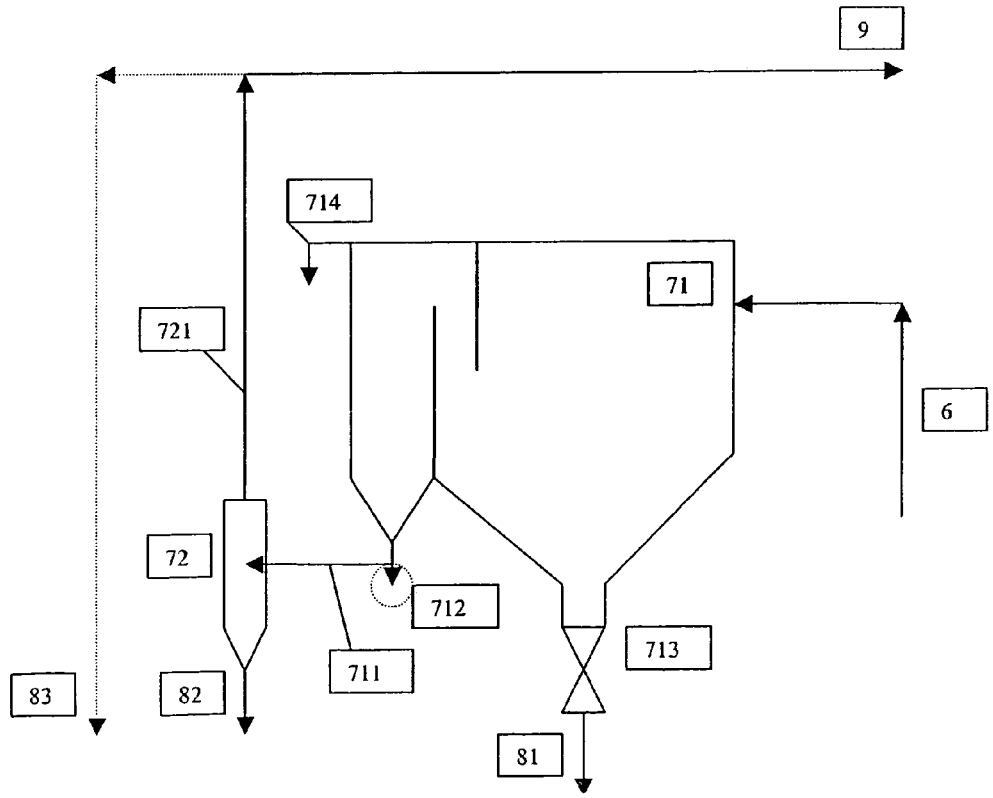

It is further possible to envisage, a simple means of clearing this underflow 81, for example by equipping this underflow with an orifice of variable section (sluice, as indicated in FIG. 6, or flap gate, as indicated in FIG. 5), held partially open during normal operating, and periodically fully open for short spells (a few seconds or tens of seconds) to evacuate any possible bulky matter. This device could possibly be also envisaged on the means of separation 72.

Finally, in the case of clogging of any one of the intake or output orifices of the second means of separation 72, which is only responsible for the separating of a modest fraction (less than 30%, preferably less than 10%) of the ballast introduced into the re-circulation circuit 6, this limited fraction of ballast circulating will be at worst lost during the time which passes before intervening, which could be rapidly triggered, for example upon detection of no flow rate on any one of the circuits coming from the overflow 721 and underflow 82 of the second means of separation 72.

A fifth means (E), which can be combined with any one of the previous means to increase the concentration of the sludge in the system (notably to improve the performance of the injection of Powdered Activated Carbon by increasing its resting time in the system), or to increase the concentration of the extracted sludge, is proposed by this invention.

This means (see FIG. 8) consists in inserting a tank 62, preferably equipped with homogenisation means such as one or several stirrers 63 to maintain a homogeneous concentration of sludge and ballast in said tank 62, into which is injected, gravitationally or with the help of a pump 61, the sludge/ballast mix extracted from the decantation zone 4, as well as a part of the overflow of the means of separation 7, constituted of sludge separated from the ballast, re-circulated in the tank 62 so as to diminish the concentration of the ballast in the latter.

A pump 64 extracts the sludge/ballast mix from the tank 62 (at a flow rate equal to the ballast plus sludge flow rate extracted from the decantation zone added to the flow rate of re-circulated sludge via 66 starting from the overflow of the means of separation 7), to sent it to the means of sludge/ballast separation 7.

This means (E) allows to increase the sludge by diminishing the rate of extraction of the sludge/ballast mix at the bottom of the decantation zone 4, without increasing the concentration of the ballast in the mix arriving at the separator 7.

The concentration of the ballast in the underflow (and by direct correlation, at the inlet) of the means of separation 7 constituting a good operating limit for this means of separation, the dilution of the ballast via a recycling of a part of the processed sludge constitutes a useful means of allowing the desired increase of concentration of the extracted sludge without increasing the concentration of the ballast in the separator 70, and therefore maintaining an acceptable level of loss of ballast.

We note that this means (E) can be perfectly combined with the other means (A) to (D) described above, according to the requirements of the concentration of the extracted sludge and of the permitted loss of ballast.

It will notably be possible to combine the means (D) and (E) so as to minimise both the flow rates to be purified in the means of developed separation 72 (hydrocyclone or centrifugal) and the concentration of sand in this means.

This is performed (see FIG. 9) by combining an initial basic separation of more than 70% of the ballast (typically 90%) in the means 71 (gravity decanter or vortex type low-pressure cyclone) with a re-circulation of the sludge (separated from the ballast) 66 to introduce with the pump 64 a mix highly diluted with ballast but concentrated with sludge in the means of pressurised forced separation 72, thus simultaneously gaining on the cost of transport for the recycling (the only pressurised means to receive only a part of the re-circulated sludge), on the wear and tear of the means of separation 72 (the most vulnerable, which only receives one mix with a poor concentration of ballast), and on the efficiency of the means of separation 72 (improved due to the low concentration of ballast at the inlet).

We also note that it is possible to couple the means proposed in the invention with a direct re-circulation circuit towards the flocculation of a part of the sludge/ballast mix extracted from the bottom of the decanter.

In the case of the injection of Powdered Activated Carbon (PAC) in the system, the means (D) will be particularly efficient to re-circulate the PAC by re-circulating a part of the latter in underflow of the first means of separation proportionally to the quantity of sludge re-circulated by this very underflow, whilst improving on the second filter the efficiency of the recycling thanks to a high energy purification (generally via small hydrocyclones) of the overflow of the first means of separation, which allows for a PAC recycling rate higher than that of the sludge, as per the observations made by the applicant.

It would be preferable, in the case of the injection of PAC into the system, to recycle the sludge of the overflow, which contains PAC already partially used, rather upstream from the point of injection of the new PAC into the system, so as to maximise the trapping of various organic matter by the most used carbon injected upstream, and to reserve for the below pollutant such as pesticides, in the case of water to be made drinkable, the use of new PAC injected further downstream, preferably prior to the injection of the polymer, even more preferably more than 10 minutes before the injecting of the polymer.

The ballasted floc flocculation-decantation installations use a polyelectrolyte, often constituted of an organic polymer, so as to assemble via an action belonging to sticking the coagulated micro-flocs into bigger sized flocs linked to the ballast.

Figure 10:
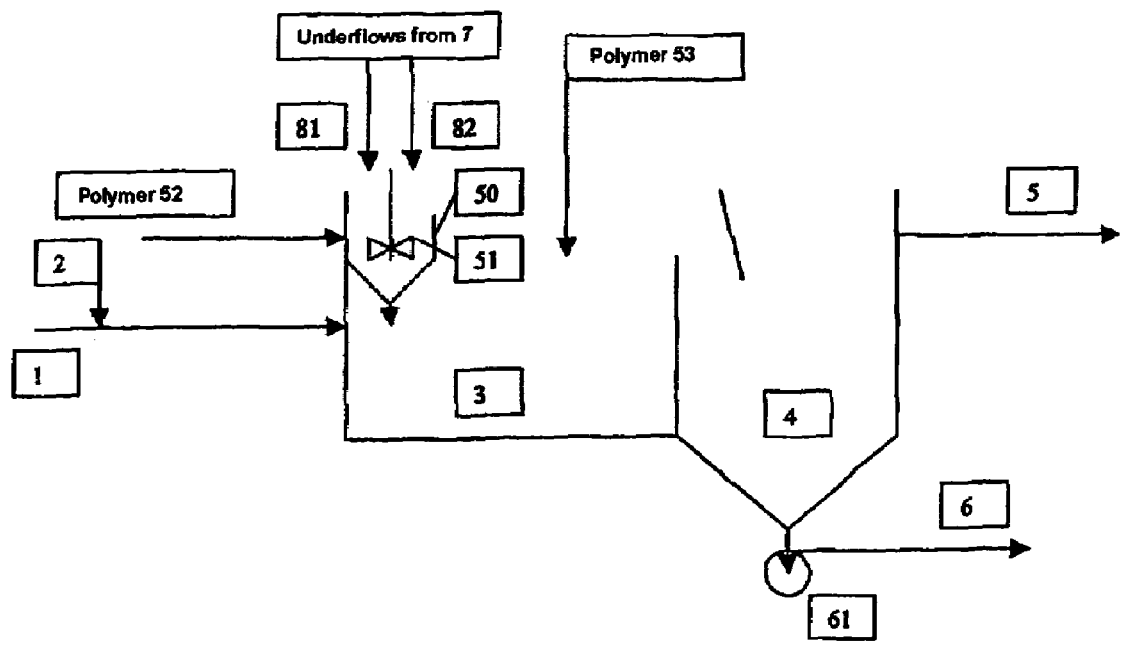

In the case of the recycling of sludge after pumping or separation into a sludge/ballast separation mechanism such as those detailed above (7, 71, 72), it will often be useful to re-flocculate at least partially the recycled sludge prior to their dilution by the flow rate of the raw water to be purified so that the pre-formed flocs can benefit from the introduction of the sludge into the flocculation zone. It is preferable to inject a part of the flocculation polymer into the underflow of the separation installation, and, preferably above all else, to envisage a pre-flocculation zone for the sludge plus ballast mix recycled starting from the underflows 8, 81, 82 . . . of the means of separation 7, 71, 72 as shown in FIG. 10, where a part of the flocculation polymer is injected via the means 52 into a pre-flocculation zone 50, preferably equipped with a low-speed stirrer 51, before bringing the re-flocculated sludge into contact with the water to be purified.

FIG. 5 details an embodiment of means (D), in which the separator 71 is a simple decanter, either designed to resist the pressure needed to operate a hydrocyclone 72, or operating, without pressure, a pump 712 thus being inserted into the feeder of the hydrocyclone 72 to ensure the operating pressure needed to carry out the desired separation for 72.

In the first case of operating without pressure in the decanter 71, the distribution of the flow rates between the underflow 81 and the overflow 711 of 71 is performed via the setting of the position of the device 713 described later on, the sludge extraction flow rate of the system is performed for example by adjusting the speed of the pump 712, and the difference between the flow rates of 712 and the one evacuated via 711 being evacuated by the overflow 714.

In the second case of operating under pressure in the decanter 71, the global re-circulation flow rate can be set by the speed of the pump 61, and the sludge extraction flow rate at the outlet 9 can, for example, be set by the relative adjusting of the speed of the pump 61 and of the position of the device 713.

The device 713 can, in its simplest version, be constituted of a simple regulating valve adapted to the passing through of a mix with a large sand content, as indicated in FIG. 6, which could be partially open for normal operating, so as to ensure the desired flow rate of the underflow, and periodically fully open so as to evacuate any possible bulky matter.

The device 713 can also, as represented in FIG. 5, be constituted of devices ensuring similar functions, for example by envisaging a large outlet opening 81 at the bottom of 71, the outlet section being set by the coaxial displacement at this outlet of a conical or spherical body which can be completely pressed against the outlet orifice, and close it, or on the contrary be periodically sufficiently removed so as to completely free the outlet and allow to evacuate the bulky matter.

A means of separation, for example a screen, can be envisaged, if necessary, downstream from the outlet 81, to separate the big elements in the ballast that we wish to recycle.

Figure 7:
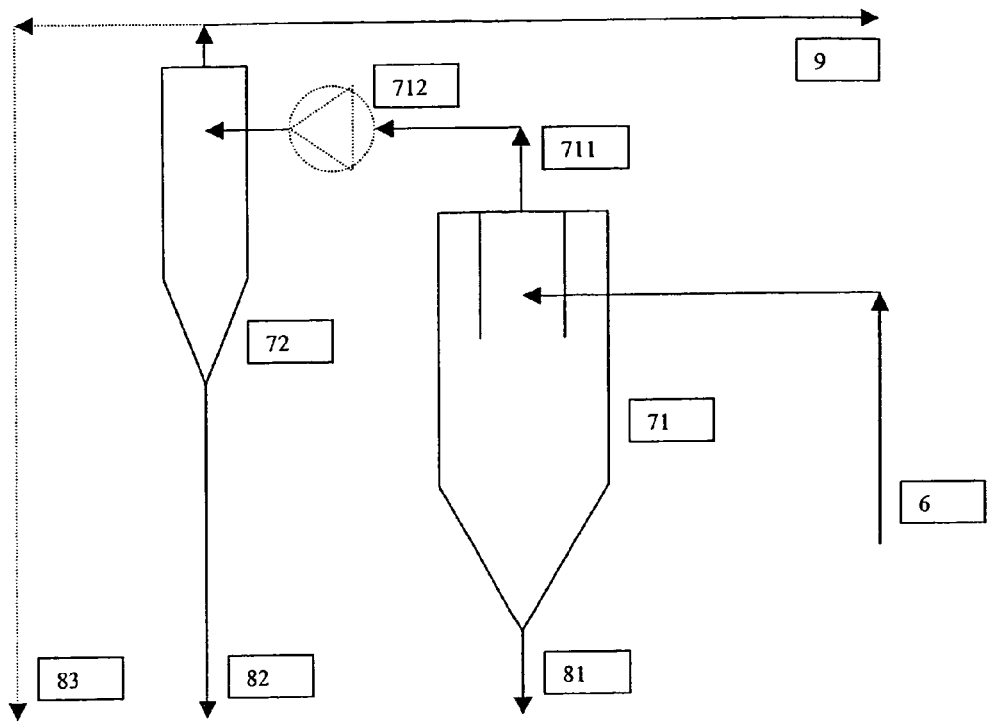

FIG. 7 describes in a similar manner a preferred embodiment of means (D), in which the means of separation 71 is constituted of a low-pressure hydrocyclone allowing a large re-circulation of the sludge in the underflow 81, of about 50% of the input flow rate in 71, whilst almost 90% of the ballast is recycled in flocculation via 81.

A system for setting the flow rate passing by 81, similar to the devices 713 described above, can be envisaged.

The overflow 711 of 71 feeds, with or without inserting a pump "booster" 712, a second hydrocyclone 72 into which enters 50% of the flow rate of the sludge and only 10% of the weight of the sand ballast recycled by the line 6.

This hydrocyclone is therefore in excellent condition to separate poor concentrations of ballast from relatively high concentrations of sludge without reaching the dry matter concentration limits in the underflow.

EXAMPLE OF AN EMBODIMENT

By way of example, the following example is described according to different modes of purification of the state of the art (cases 1 and 3) and according to the invention (cases 2, 4 and 5).

Purifying 1000 m$^3$/h of a coagulated effluent (or of coagulated surface water) containing 300 mg/L of suspended matter (SM) to obtain purified water at 30 mg/L of SP, by using reactants resulting from precipitation of salts and hydroxides on an increase of 25% of the mass of dry matter of the sludge compared to the extracted SP.

The rate of sand injected into the flocculation tank (recycled sand plus new sand in compensation of loses) is 3 kg of micro-sand with a diameter of 150 micrometers per m$^3$ of coagulated water entering into the flocculation tank.

We aim at extracting sludge of about 17 g/L, in setting a limit of 600 kg/m$^3$ (specific to the hydrocyclone used here) for the sand in the underflow of the hydrocyclone.

A summary of the results obtained is given in table N°1.

Case 1: the use of a diagram of the type proposed by the patent FR 262 7704 or FR 271 9234, with an extraction of 5% of the intake flow rate at the bottom of the decanter, and an 80%/20% distribution of the flow rate entering into the hydrocyclone 7 between the overflow and the underflow.

The concentration of the obtained sludge is 8.4 g/L; an extract of 2.5% instead of 5% allows for a concentration of extracted sludge of 16.8 g/L, but the concentration of sand in the underflow of the hydrocyclone becomes to close to the permitted limit of 6000 gk/m$^3$.

This case is illustrated in FIGS. 1a and 1b.

Case 2: identical to case 1, with an overflow/underflow distribution at a ratio of 60%/40%.

This case is also illustrated in FIGS. 1a and 1b.

Case 3: direct re-circulation of 50% of the sand/sludge mix extracted from the bottom of the decanter 4, a hydrocyclone 71 being envisaged to recuperate the sand on the sludge extraction loop, with an overflow/underflow volumetric ratio of 80%/20%.

This case is illustrated in FIG. 2.

Case 4: identical to case 1, with a recycling of 50% of the overflow of the hydrocyclone 71.

Figure 4:
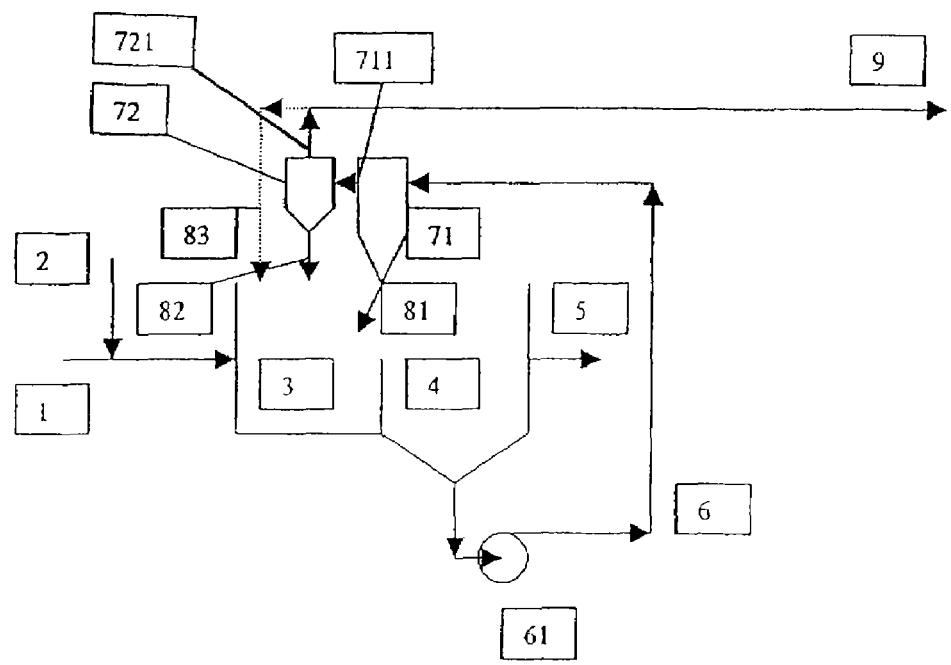

This case is illustrated in FIG. 4.

Case 5: identical to case 1, with a double system of separation via a first cyclone of preliminary purification 71 distributing the volumetric flow rate of the sludge in the overflow/underflow ratio of 50%/50%, and the mass flow rate of the sand in a ratio of 10%/90%, and a second cyclone 72 distributing the volumetric flow rate entering into the overflow/underflow ratio of 80%/20%, and practically eliminating all the sand of the extracted overflow.

This case is illustrated in FIG. 4.

Case 6: according to the diagram (E) above; we extract from the bottom of the decanter 3% of the flow rate of intake water, that being 30 m$^3$/h, which is mixed at 20 m$^3$/h drawn from the overflow of the hydrocyclone, prior to pumping towards the hydrocyclone.

Figure 8:
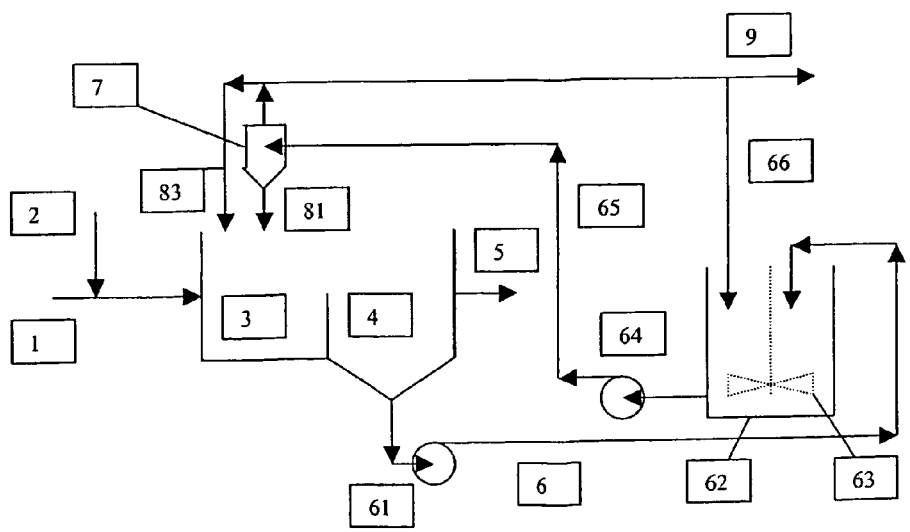

This case is illustrated in FIG. 8.

Case 7: combination of case 6 with a double system of separation similar to case 5; we extract from the bottom of the decanter 6% of the flow rate of intake water, that being 60 m$^3$/h, which is mixed at 6.6 m$^3$/h drawn from the overflow of the hydrocyclone, prior to pumping 66.6 m$^3$/h towards the hydrocyclone.

Figure 9:
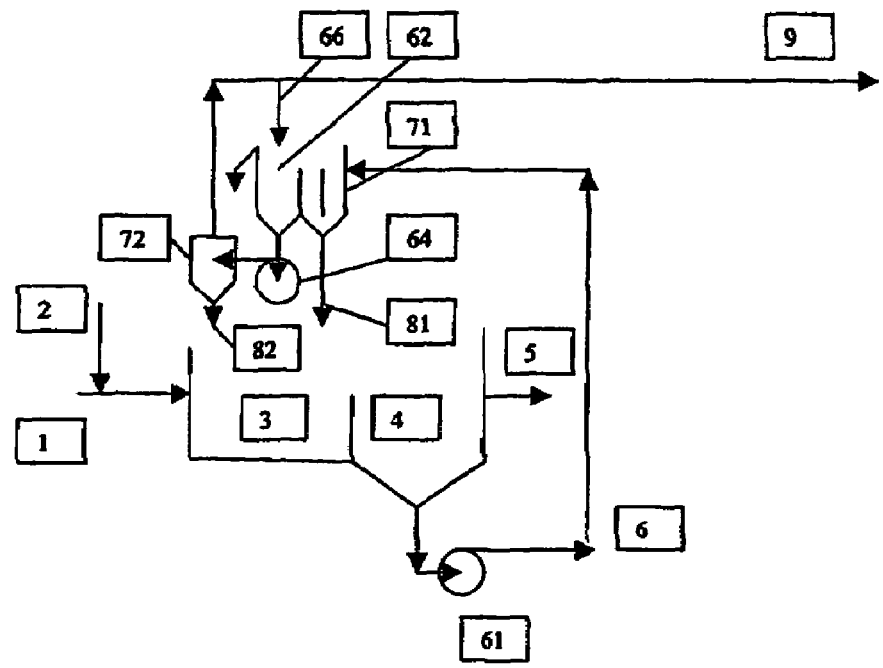

This case is illustrated in FIG. 9.

The table No 1 compares the flow rates and concentrations of sand and sludge at different points on the diagram, by setting the operating parameters to concentrate the extracted sludge to about 17 g/L.

If the concentration limit of sand in the underflow is set to 600 kg/m$^3$, we note that:

case 1 only allows to reach the 17 g/L at the concentration limit in the underflow of the hydrocyclone (600 kg/m$^3$);

case 3 (corresponding to the patent FR 275 8812, allows to obtain this concentration of extracted sludge with a sand concentration equal to 300 gk/m$^3$ in the underflow of the hydrocyclone, as in case 4 (performed more simply by simple recycling of 50% of the overflow of the hydrocyclone) and 6;

case 2 (60%/40% distribution between the overflow and the underflow of the hydrocyclone) has the advantage of obtaining the desired 17 g/L with a rather low concentration (230 kg/m$^3$) of sand in the underflow of the hydrocyclone, with the simplest diagram, but at the cost of a higher energy consumption;

case 5, and most of all case 7, using two means of separation in tandem, allow to obtain the 17 g/L of extracted sludge with very low concentrations of sand in the underflow of the second means of separation (the most important so as to limit the loss of sand): 60 kg/m$^3$ for case 5 and 45 kg/m$^3$ for case 7.

Depending on the desired purpose, we can thus preferably use the following cases:

Energy saving, average to high concentration of sludge in the flocculator: cases 5 and 7;

Investment saving, low concentration of sludge in the flocculator: cases 1, 2 and 6;

Investment saving, average concentration of sludge in the flocculator: case 4.

TABLE N°1

| Characteristics | Case 1 | Case 2 | Case 3 | Case 4 | Case 5 | Case 6 | Case 7 |
|---|---|---|---|---|---|---|---|
| | Overflow/ underflow 80/20 | Overflow/ underflow 60/40 | Direct re-circulation 50% | 1 + re-circulation 50% overflow | 2 means of separation | Inter-mediary tank 62 | Tank 62 + 2 means of separation |
| Raw water flow rate (m³/h) | 1000 | 1000 | 1000 | 1000 | 1000 | 1000 | 1000 |
| SM concentration in raw water (mg/L) | 300 | 300 | 300 | 300 | 300 | 300 | 300 |
| Sand rate (recycled kg/m³ raw water) | 3 | 3 | 3 | 3 | 3 | 3 | 3 |
| Flow rate extracted from the bottom of the decanter 4 (m³/h) | 25 | 33.3 | 50 | 50 | 50 | 30 | 60 |
| Flow rate re-circulated directly via 20 (m³/h) | — | — | 25 | — | — | — | — |
| Pump flow rate 61 (m³/h) | 25 | 33.3 | 25 | 50 | 50 | 30 | 60 |
| Flow rate arriving at means 7 or 71 (m³/h) | 25 | 33.3 | 25 | 50 | 50 | 50 | 66.6 |
| Flow rate arriving at means 72 (m³/h) | — | — | — | — | 25 | — | 33.3 |
| Sand concentration entering 71 (kg/m³) | 120 | 91 | 60 | 60 | 60 | 60 | 45 |
| Sand concentration in underflow 71 (kg/m³) | 600 | 227 | 300 | 300 | 108 | 300 | 81 |
| Sand concentration entering 72 (kg/m³) | — | — | — | — | 12 | — | 9 |
| Sand concentration in underflow 72 (kg/m³) | — | — | — | — | 60 | — | 45 |
| Sludge concentration in flocculation 3 (g/L) | 0.45 | 0.58 | 0.85 | 0.85 | 0.85 | 0.53 | 1 |
| Sludge concentration extracted via 9 (g/L) | 16.9 | 17.05 | 16.9 | 16.9 | 16.9 | 16.9 | 16.9 |

In brief, the invention therefore aims at incorporating every method of purifying water containing colloidal, dissolved or suspended impurities pre-coagulated upstream from the process, via a flocculation-decantation purification ballasted with pre-coagulated water comprising the following stages consisting in:

introducing the coagulated water into the flocculation zone, to allow the flocculation of the micro-flocs in the presence of and around a ballast constituted of at least an insoluble granular matter heavier than the water and at least a reactive flocculant;

introducing the mix of water and flocs into the decantation zone; separate the purified water in the overflow of a mix of sludge and ballast resulting from the decantation of the flocs extracted from the underflow in the decantation zone;

extracting the sludge/ballast mix in the underflow of the decantation zone;

sending at least part of this mix towards the sludge/ballast separation system allowing to extract the sludge separated from the ballast and to recycle in or upstream from the flocculation zone the ballast and a part of the sludge introduced into said separation system;

characterised in that it comprises the stages consisting in:

sending all of said sludge/ballast mix issuing from the decantation of said sludge/ballast separation system;

subjecting said sludge/ballast mix to at least a concentration of ballast for the exiting flows recycled in or upstream from the flocculation zone;

extracting the ballast without the sludge extracted from the separation system and in that more than 20% of the volume entering the sludge/ballast separation system is recycled in or upstream from the flocculation zone, once have passed through at least a part of the sludge/ballast separation system, in that the ballast has an effective diameter greater than 40 micrometers, and in that the sludge extracted from the purification system has a concentration higher than 5 g/L.

preferably the ballast used has an effective diameter lying between 80 and 200 micrometers, and in that the extracted sludge has a concentration at least equal to 10 g/L;

Advantageously, the ballast used is constituted of a real density matter greater than 2, and is preferably of sand.

According to an alternative to the invention, the sludge/ballast separation system used is constituted of a cyclone or of several cyclones installed, in parallel, recuperating the ballast and more than 10% of the sludge in the underflow of said decanter. In this case, said cyclone recycles in the underflow 40% or more of the sludge that it receives, as well as more than 99.5% of the ballast it receives.

Advantageously, at least a part of the total overflow of said cyclone is recycled in or upstream from the flocculation zone. In this case, at least 50% of the overflow of said cyclone is recycled in or upstream from the flocculation zone.

According to another alternative to the invention, said sludge/ballast separation is performed thanks to a sludge/ballast separation system constituted of at least two means of separation in tandem, the first means separating in the underflow recycled in or upstream from the flocculation zone at least 10% of the volume of sludge and 60% of the weight of the ballast entering into this first means, and the second means separating in the underflow recycled in or upstream from the flocculation zone the ballast and any part of the sludge contained in the flow that it receives from the overflow of the first means.

Advantageously, the first means separates in the underflow recycled in or upstream from the flocculation zone about 50% or more of the volume of the sludge and 80% or more of the weight of the ballast entering into this first means, and the second means separates in the underflow recycled in or upstream from the flocculation zone all the practically measurable ballast and in addition 20% of the sludge contained in the flow that it receives from the overflow of the first means.

According to an alternative, the first means of sludge/ballast separation used is constituted of a pressurised simple gravity decanter, and the second means of sludge/ballast separation used is constituted of a hydrocyclone receiving the overflow from the first means.

According to another alternative, the first means of sludge/ballast separation used is constituted of a non-pressurised simple gravity decanter, and the second means of sludge/ballast separation used is constituted of a hydrocyclone receiving the overflow from the first means via a pressure providing pump.

According to yet another alternative, the first means of sludge/ballast separation used is constituted of a pressurised hydrocyclone, and the second means is constituted of a hydrocyclone receiving the overflow from the first means without the intervention of an intermediary pump.

According to yet another alternative, the first means of sludge/ballast separation used is constituted of a low-pressurised hydrocyclone, lower than that which is necessary to efficiently separate the ballast from the sludge in the second means, and the second means of sludge/ballast separation used is constituted of a hydrocyclone receiving the overflow from the first means via a pressure providing pump.

Preferably, the method comprising a stage consisting in setting the flow rate of at least one of the means of sludge/ballast separation with the help of a device for setting the flow rate of the underflow.

Advantageously, said stage of setting is performed thanks to a feed valve.

Preferably, said setting device comprises a half-open position for normal operating, said device is periodically fully open, manually or automatically, to evacuate the bulky matter brought by the re-circulation and susceptible to clogging the underflow of the means equipped with a device.

The invention also relates to every method of purifying water containing colloidal, dissolved or suspended impurities pre-coagulated upstream from the process, via a flocculation-decantation purification ballasted with pre-coagulated water comprising the following stages consisting in:

introducing the coagulated water into the flocculation zone, to allow the flocculation of the micro-flocs in the presence of and around a ballast constituted of at least an insoluble granular matter heavier than the water and at least a reactive flocculant;

introducing the mix of water and flocs into the decantation zone; separate the purified water in the overflow of a mix of sludge and ballast resulting from the decantation of the flocs extracted from the underflow in the decantation zone; extracting the sludge/ballast mix in the underflow of the decantation zone;

sending at least part of this mix towards the sludge/ballast separation system allowing to extract the sludge separated from the ballast and to recycle in or upstream from the flocculation zone the ballast and a part of the sludge introduced into said separation system;

characterised in that it comprises the stages consisting in arranging an intermediary mixing zone between the extraction point at the bottom of the decantation zone of the sludge/ballast mix and prior to the sludge/ballast separation system, this zone receiving on one hand the sludge/ballast mix extracted from the decantation zone and on the other hand a re-circulation of a part of the sludge issuing from said sludge/ballast separation stage after separation from the ballast which was part of it, the flow rate of this re-circulation being adjusted so that the concentration of the sludge extracted from the system is greater than 5 g/L;

sending the contents of this intermediary mixing zone to said stage of sludge/ballast separation.

According to an alternative this method can be combined with the aforementioned method.

According to an alternative, this method comprises a stage consisting in injecting at least a part of the flocculation assisting polymer into at least one of the circuits recycling the sludge or the ballast using the means of sludge/ballast separation.

Advantageously, the method comprises a stage according to which the sludge and ballast recycled upstream from the flocculation zone starting from the underflow of the means of separation are pre-flocculated in the pre-flocculation zone with the help of a reactive flocculant upstream from their introduction into the flocculation zone of the water to be purified.

Also advantageously, the method comprises a stage consisting in injecting the new Powdered Activated Carbon into the flocculation zone.

In this case the method comprises, according to an alternative, a stage consisting in adding a direct re-circulation loop into or upstream from the flocculation zone of a part of the sludge/ballast mix extracted from the bottom of the decanter.

According to an aspect of the invention, said new Powdered Activated Carbon can be injected upstream from the flocculation zone.

All or part of the flow recycled via the means of separation or direct re-circulation, containing re-circulated Powdered Activated Carbon, can be sent into or upstream from the flocculation zone.

All or part of the flow recycled via the means of separation (or direct re-circulation), containing re-circulated Powdered Activated Carbon, can be sent into a contact zone for used activated carbon, arranged upstream from the injection of new Powdered Activated Carbon.

The invention claimed is:

1. A ballasted flocculation process for purifying water comprising:
   a. mixing a coagulant with the water;
   b. selecting a ballast in the form of insoluble granular material where the insoluble granular material has an effective diameter between approximately 40 and 300 micrometers;
   c. mixing the selected ballast with the water and mixing a flocculant with the water to form flocs and microflocs around the ballast;

d. introducing the mixture of water and flocs into a decantation zone;
e. in the decantation zone, separating purified water from a mix of sludge and ballast;
f. directing the mix of sludge and ballast from the decantation zone to a separator that is operative to separate the sludge and ballast;
g. separating the ballast from the mix of sludge and ballast and recycling the separated ballast to or upstream mixing step c. wherein the separated ballast recycled constitutes 20% or more by volume of the mix of sludge and ballast directed to the separator;
h. separating sludge from the mix of sludge;
i. concentrating the separated sludge, recycling at least a part of the sludge to or upstream mixing step c., and wasting a portion of the sludge wherein the concentration of the sludge wasted is at least 5 g/L; and
j. directing at least some of the mix of sludge and ballast from the decantation zone to an intermediary mixing zone; directing at least some of the sludge separated by the separator to the intermediary zone and mixing the mix of sludge and ballast with at least a part of the separated sludge; directing the mixture of the mix of sludge and ballast and the separated sludge from the intermediary mixing zone to the separator and continuing to return separated sludge from the separator to the intermediary mixing zone.

2. The method of claim 1 including directing the mix of sludge and ballast to two or more hydrocyclones that separate the ballast from the sludge.

3. The method of claim 1 including directing the mix of sludge and ballast to a first separator and producing an underflow and an overflow from the first separator, and directing the overflow of the first separator to a second separator and producing an overflow of sludge and an underflow of ballast from the second separator; and wherein the underflow of the first separator includes a sludge having a volume that is equal to or greater than 10% of the volume of the mix of sludge and ballast directed to the first separator and wherein the underflow of the first separator includes a ballast that comprises by weight 60% or more of the ballast produced in the underflow of the second separator.

4. The method of claim 3 wherein the ratio of the ballast, by weight, in the underflow of the first separator to the weight of the ballast in the underflow of the second separator is at least 90%.

5. The method of claim 3 wherein the first separator includes a non-pressurized simple gravity decanter, and wherein the second separator comprises a hydrocyclone, and wherein there is provided a pump for pumping the overflow of the simple gravity decanter to the hydrocyclone.

6. The method of claim 3 wherein both first and second separators include a hydrocyclone.

7. The method of claim 1 including injecting powdered activated carbon into the water.

8. The method of claim 7 wherein the ballasted flocculation process is carried out in a ballasted flocculation system having a flocculation zone, and wherein the powdered activated carbon is injected into the flocculation zone and mixed with the water, flocculant and ballast.

9. The method of claim 1 including recycling directly a portion of the mix of sludge and ballast from the decantation zone directly into the water being treated without the mix of sludge and ballast being subjected to a separation process carried out by the separator.

10. The method of claim 1 wherein the ballasted flocculation process is carried out in a ballasted flocculation system including a flocculation zone and wherein the method includes injecting powdered activated carbon into the ballasted flocculation system upstream from the flocculation zone.

11. The method of claim 1 including injecting powdered activated carbon into the water and mixing the powdered activated carbon with the flocculant and the ballast, and wherein the method includes recycling at least a portion of the powdered activated carbon to or upstream mixing step c.

* * * * *